Oct. 19, 1954

E. LATTA 2,691,894

WINDSHIELD WIPER DRIVE

Filed Dec. 6, 1950

INVENTOR
Edward Latta.

BY Martin J. Finnegan
ATTORNEY

Oct. 19, 1954  E. LATTA  2,691,894
WINDSHIELD WIPER DRIVE
Filed Dec. 6, 1950  3 Sheets-Sheet 2

INVENTOR.
Edward Latta.
James Franklin
ATTORNEY

Patented Oct. 19, 1954

2,691,894

UNITED STATES PATENT OFFICE 2,691,894

WINDSHIELD WIPER DRIVE

Edward Latta, Owosso, Mich., assignor to Redmond Company, Inc., Owosso, Mich., a corporation of Michigan Application December 6, 1950, Serial No. 199,543

4 Claims. (Cl. 74—75)

This invention relates to windshield wiper operation, and particularly to the production and control of the swinging motion of wiper blades across the glass of the windshield of a motor vehicle.

The object of the invention is to provide an electrical drive of novel construction, including a novel method of converting uni-directional rotary motion to bi-directional swinging motion, in such manner as to maintain true synchronism at each limit of swing, as between the right and left-hand wiper blades.

This and other objects of the invention will be understood upon reference to the following description of the details of the particular embodiments of the invention illustrated in the accompanying drawings, wherein.

Figure 1:
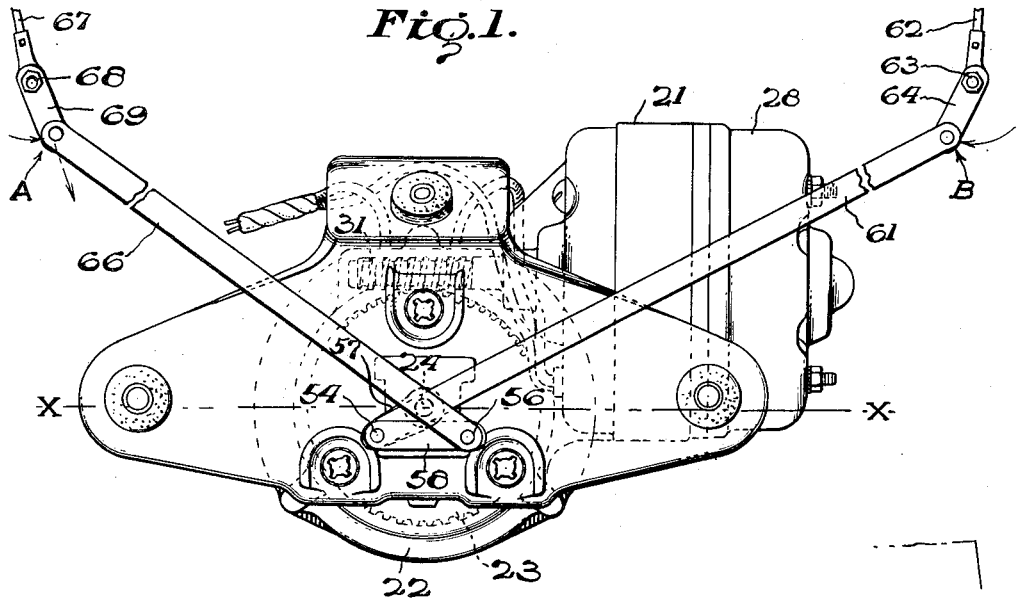
Fig. 1 is a view in elevation of an electric motor drive for a set of wiper blades, the view including a showing of the novel motion translating connections for converting the rotary motion of the motor gearing to the swinging motion of the blades; the linkage being shown in one extreme position.

The invention is not limited to the particular embodiment illustrated in the drawings as listed above and it is to be understood that deviations from the illustrated embodiment may occur within the limits of the invention so long as the principles thereof are retained.

Figure 2:
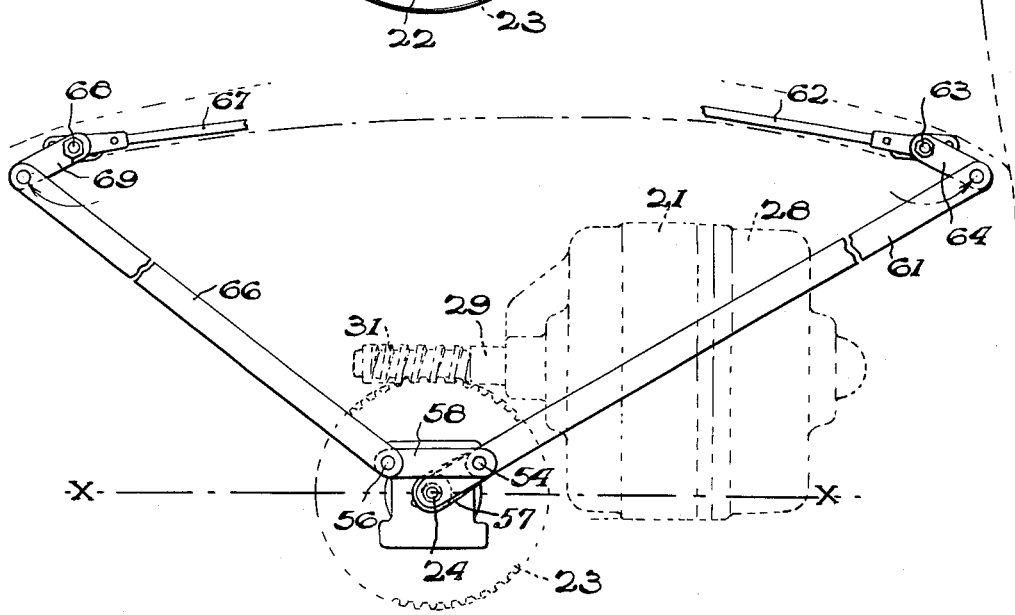
Fig. 2 is a view similar to Fig. 1, but with the motion translating linkage in its opposite extreme position.
Figure 3:
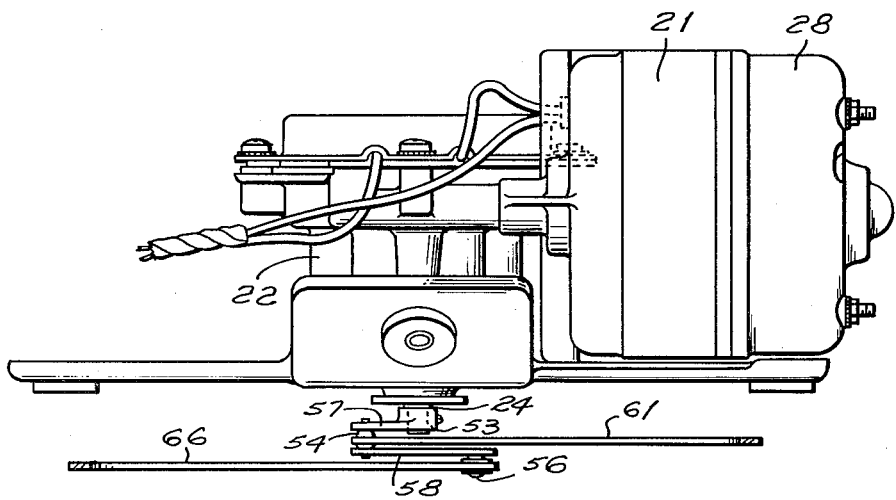
Fig. 3 is a top plan view of the assembly of Figs. 1 and 2.

The driving motor is illustrated as being embodied in a housing one portion 21 of which is in the form of a casting having an extended portion 22 (shown best in Fig. 3) constituting the housing for a worm gear 23 and a transversally disposed shaft 24 drivably connecting the worm gear with the wiper blades of the motor vehicle by way of intervening linkage of novel construction as hereinafter described. The complementary portion 28 of the motor housing is in the form of a metal stamping of cylindrical contour to match and abut the cylindrical edge of the casting 21 to complete the covering for the motor; the complementary housing sections 21 and 28 having suitable bearing assemblies for rotatably supporting the armature shaft 29. As shown in Fig. 2 the armature shaft extends beyond the electrical elements of the motor and into the portion 22 of the enclosing casting; the extending portion of the armature shaft having worm teeth 31 formed thereon for engagement with the corresponding teeth of the worm gear 23 whereby the rotation of the motor is imparted to the worm gear at a considerably reduced speed to conform to the desired speed of oscillation of the wiper blades.

Figure 4:
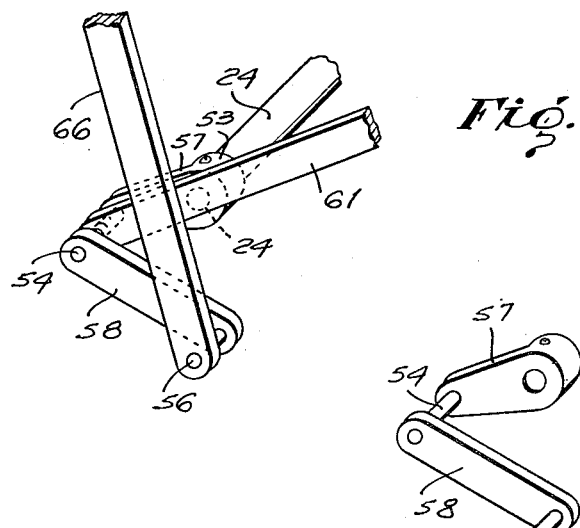
Fig. 4 is an exploded perspective view of parts of the motion translating linkage.
Figure 5:
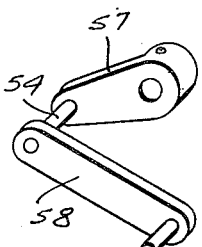
Fig. 5 is a perspective view of integral parts of the translating linkage.

The shaft 24 is received and rotatably supported within the casting 22 but has its outer portion projecting beyond said casting to receive a double crank assembly comprising crank arms 57 and 58 integrally united to rotate as a unit, the crank arm 58 being oriented at an angle to the crank arm 57 (when viewed in a direction substantially parallel to the axis of rotation of the crank arm assembly). The integrality of the crank arms 57 and 58 and the crank bearing 54 is best shown in Figs. 4 and 5 and is fully indicated in Figs. 1, 2, 6 and 7. The inner end 53 of the crank arm 57 of the double crank assembly 57, 58 is fixedly attached to the shaft 24. The element 54 which integrally unites the crank arms 57 and 58 defines a crank bearing for a connecting link 61, and the element 56 extending from the free end of the crank arm 58 defines a crank bearing for an oppositely disposed connecting link 66.

From the crank bearing 54 the link 61 extends toward the right-hand wiper blade which is operated by way of the wiper arm 62, a pivot shaft 63 and a short crank arm 64; the pivot shaft 63 being rotatable about a fixed axis which of course is the axis of the bearing built into the cowling of the vehicle. The other crank bearing 56 receives the link 66 which extends toward the left-hand wiper blade which is operated by way of the wiper arm 67, a pivot shaft 68 and a short crank arm 69 pivotally connected to the link 66, and having a pivot bearing in the vehicle column of the pivot shaft 68 corresponding to that for the pivot shaft 63.

With this described structure of the compound crank assembly 57, 58 and its relation to the linkage connecting the same to the wiper blade assemblies, the driving motor and the gearing connecting the motor shaft to the crank shaft 24 may be located any selected distance below the base line of the wiper blade assemblies, e. g., any selected distance below the lower edge of the windshield of an automobile as is illustrated in Figs. 1 and 2 of the drawings; and with the relationship between the elements of the compound crank assembly and its connecting linkage to the wiper blades as hereinbelow described with reference to the diagrams of Figs. 6 and 7, the aforesaid true synchronism of the swinging motion of the wiper blades may be effectuated and maintained for each given or selected installation of the apparatus.

Figure 6:
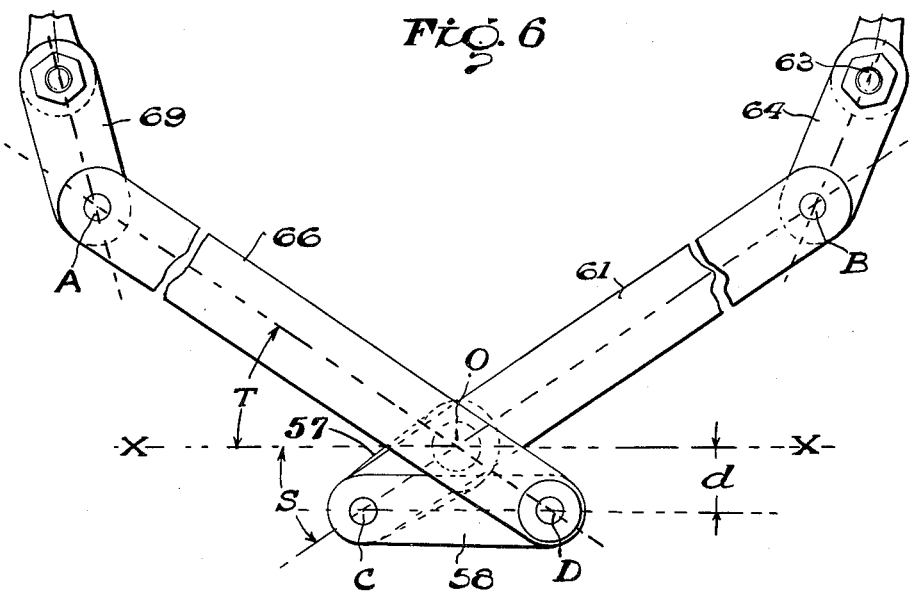
Figs. 6 and 7 are explanatory linkage diagrams.
Figure 7:
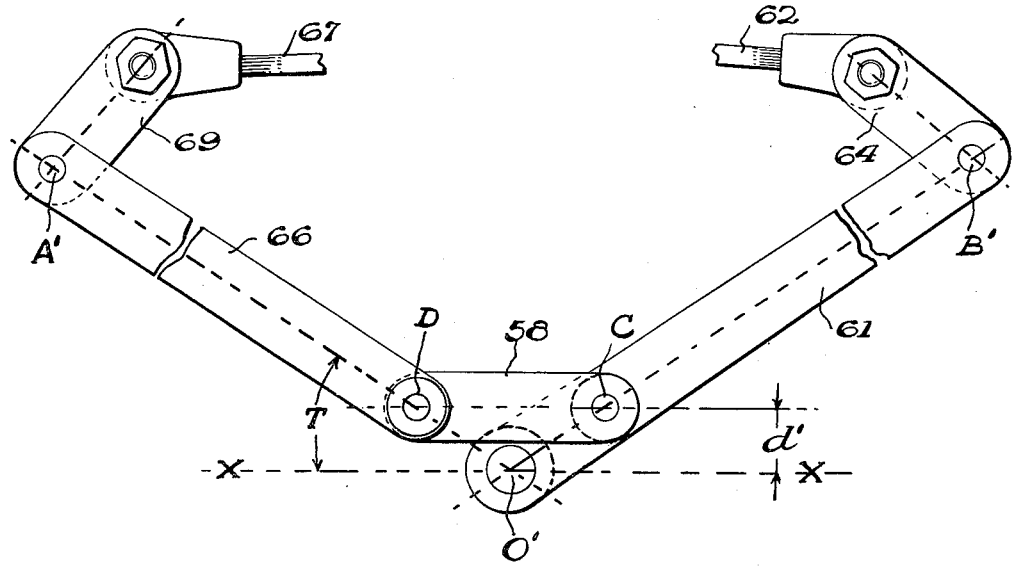

In order to produce true synchronous motion of the wiper blades in response to the rotation of the driving shaft 24, the crank arms 57 and 58 of the double crank assembly 57, 58 and the links 61 and 66 are inter-related in the manner indicated by the diagrams shown in Figs. 6 and 7 of the drawings, Fig. 6 illustrating the relationships that prevail when the wiper arm blades are at one extreme position and Fig. 7 illustrating the relationships that prevail when the wiper blades are at the opposite extreme position. In the diagrams as represented by Fig. 6 the letter O designates the center of rotation of the shaft 24, the letter A represents the center of the pivotal connection of the link 66 and arm 69, the letter B represents the center of the pivotal connection of the link 61 and arm 64, the letter C represents the center or point of the crank bearing 54 for the link 61, the letter D represents the center of the crank bearing 56 for the link 66, and the line X—X is a horizontal line passing through the fixed center of rotation of the shaft 24.

Upon comparative study of the two diagrams (Figs. 6 and 7) it will be observed when the wiper arm blades are in either extreme position of their cycle of motion there is exact alignment of the points A and O with the crank bearing center D, the alignment in one position being in the sequence A—O—D (Fig. 6) and in the opposite extreme position A'—D—O' (Fig. 7). Likewise, in these two extreme positions there is alignment of the points O and B with the crank bearing center C, the alignment in one extreme position being in the sequence C—O—B (Fig. 6) and in the opposite extreme position in the sequence O'—C—B' (Fig. 7). Moreover, the distance $d$ by which the crank bearing centers C and D drop below the plane X—X in the Fig. 6 position is exactly equal to the distance $d^1$ by which the said crank bearing centers C and D rise above said plane X—X in the Fig. 7 position. These relationships assure perfect synchronization of the wiper arm blades at both extreme positions, namely, the vertical position of the blades (Fig. 6) and the horizontal position (Fig. 7).

In the arrangement depicted in Figs. 6 and 7, the angle offset of the cranks with respect to the horizontal plane X—X—in other words, the angle as indicated by the letter S—is chosen so that it will correspond and equal exactly the angle (designated as angle T) formed by the line A—O—D with respect to the horizontal plane X—X. In other words, the linkage and crank positions are there so laid out as to insure exact symmetry of the lines A—O—D and C—O—B (taking the Fig. 6 positions as a guide) with respect to said plane X—X. Moreover, these angles are the same in the Fig. 7 position as in the Fig. 6 position.

I claim:

1. In a windshield wiper drive, a driving shaft rotatable continuously in one direction, a pair of pivot shafts disposed at points spaced from said driving shaft, one to the left of said driving shaft and the other to the right, a relatively short pair of connecting elements, each operatively connected to one of said pivot shafts, a pair of longer connecting elements whose outer ends pivotally connect with said short connecting elements respectively, and a pair of crank arms pivotally connecting respectively with said longer connecting elements at their inner ends, one of said crank arms being secured to said driving shaft for rotation therewith, the second crank arm being secured to the first at the outer end of the latter and being oriented at an angle thereto when viewed in a direction substantially parallel to the axis of rotation of said first arm, and the mounting of said crank arms and elements being such that in each extreme position of said elements the axis of rotation of said driving shaft intersects each of two straight lines, one of which lines joins the two end pivot points of one of said longer elements, and the other of which lines joins the two end pivot points of the other of said longer elements.

2. In a windshield wiper drive, a driving shaft rotatable continuously in one direction, a pair of pivot shafts disposed at points spaced from said driving shaft, a first pair of connecting elements each operatively connected to one of said pivot shafts, a second pair of connecting elements whose outer ends pivotally connect with said first connecting elements respectively, and a pair of crank arms pivotally connecting respectively with said second connecting elements at their inner ends, one of said crank arms being secured to said driving shaft for rotation therewith, the second crank arm being secured to the first at the outer end of the latter, and being oriented at an angle thereto when viewed in a direction substantially parallel to the axis of rotation of said first arm, and the mounting of said crank arms and elements being such that in each extreme position of said elements the axis of rotation of said driving shaft lies on a straight line joining the two end pivot points of each of said second elements.

3. In a windshield wiper drive, a driving shaft rotatable continuously in one direction, a pair of pivot shafts disposed at points spaced from said driving shaft, a first pair of connecting elements each operatively connected to one of said pivot shafts, a second pair of connecting elements whose outer ends pivotally connect with said first connecting elements respectively, and a pair of crank arms pivotally connecting respectively with said second connecting elements at their inner ends, one of said crank arms being secured to said driving shaft for rotation therewith, the second crank arm being secured to the first at the outer end of the latter and being oriented at an angle thereto when viewed in a direction substantially parallel to the axis of rotation of said first arm, and the mounting of said crank arms and elements being such that in each extreme position of said elements said second crank arm is disposed in a horizontal attitude, with its center line equidistant from the axis of rotation in each of said attitudes.

4. In a windshield wiper drive, a driving shaft rotatable continuously in one direction, a pair of wiper arms disposed at points spaced from said driving shaft, means operatively connecting said driving shaft with said wiper arms, said connecting means including a first crank arm secured to said driving shaft for rotation therewith, and a second crank arm secured to said first crank arm at the outer end thereof and being oriented at an angle thereto when viewed in a direction substantially parallel to the axis of rotation of said first arm, the mounting of said crank arms being such that in one extreme position of said wiper arms the second crank arm is disposed at a certain distance above the axis of rotation of said driving shaft, and in the opposite extreme position said second crank arm is disposed at an equal distance below the axis of rotation of said driving shaft.

References Cited in the file of this patent

UNITED STATES PATENTS

| Number | Name | Date |
|---|---|---|
| 2,059,509 | Dykstra | Nov. 3, 1936 |
| 2,129,542 | Wernert et al. | Sept. 6, 1938 |
| 2,173,447 | Horton | Sept. 19, 1939 |
| 2,232,480 | Schmid | Feb. 18, 1941 |
| 2,464,847 | Coffey | Mar. 22, 1949 |
| 2,491,697 | Vischulis | Dec. 20, 1949 |